United States Patent
Hassler et al.

(10) Patent No.: US 9,869,610 B2
(45) Date of Patent: Jan. 16, 2018

(54) METHOD FOR DETECTING VIBRATION IN A RAIL VEHICLE

(71) Applicant: SIEMENS AKTIENGESELLSCHAFT, Munich (DE)

(72) Inventors: Stefan Hassler, Kirchenthumbach (DE); Wolfgang Rulka, Munich (DE); Thorsten Stuetzle, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 14/763,908

(22) PCT Filed: Jan. 27, 2014

(86) PCT No.: PCT/EP2014/051505
§ 371 (c)(1),
(2) Date: Jul. 28, 2015

(87) PCT Pub. No.: WO2014/114788
PCT Pub. Date: Jul. 31, 2014

(65) Prior Publication Data
US 2015/0362407 A1 Dec. 17, 2015

(30) Foreign Application Priority Data
Jan. 28, 2013 (DE) .................. 10 2013 201 289

(51) Int. Cl.
*B60L 3/00* (2006.01)
*G01M 17/10* (2006.01)
*B61F 5/50* (2006.01)

(52) U.S. Cl.
CPC .............. *G01M 17/10* (2013.01); *B61F 5/50* (2013.01)

(58) Field of Classification Search
CPC ........ B60L 3/00; B60L 3/0023; B60L 3/0038; B60L 3/08; B60L 3/10; B60L 3/12
See application file for complete search history.

(56) References Cited

U.S. PATENT DOCUMENTS

| | | | |
|---|---|---|---|
| 3,937,152 A * | 2/1976 | Nilsson ................. | B60L 3/00 105/61 |
| 5,579,013 A | 11/1996 | Hershey et al. | |
| 8,276,995 B2 | 10/2012 | Kurich et al. | |
| 2008/0156944 A1 | 7/2008 | Aurich et al. | |
| 2011/0231039 A1 | 9/2011 | Leitel et al. | |

(Continued)

FOREIGN PATENT DOCUMENTS

| | | |
|---|---|---|
| CN | 101132961 A | 2/2008 |
| CN | 101850772 A | 10/2010 |
| CN | 102333687 A | 1/2012 |

(Continued)

*Primary Examiner* — R. J. McCarry, Jr.
(74) *Attorney, Agent, or Firm* — Laurence Greenberg; Werner Stemer; Ralph Locher

(57) ABSTRACT

A method for detecting a vibration of a driven axle system of a rail vehicle includes a sensor system detecting a parameter indicating the vibration of an element of the axle system and an evaluating unit evaluating a signal of the sensor system. In order to reliably detect the vibration of the driven axle system of the rail vehicle, the sensor system includes a motion sensor which detects a motion of the element as the parameter.

10 Claims, 1 Drawing Sheet

(56) References Cited

U.S. PATENT DOCUMENTS

2012/0259487 A1 10/2012 Friesen et al.
2016/0144876 A1 5/2016 Leitel et al.

FOREIGN PATENT DOCUMENTS

| DE | 2406479 A1 | 9/1974 |
| DE | 10062602 A1 | 6/2002 |
| DE | 102005010118 A1 | 9/2006 |
| DE | 19580680 B4 | 12/2009 |
| DE | 102009020428 A1 | 5/2010 |
| DE | 102009042555 A1 | 3/2011 |
| DE | 102009053801 A1 | 5/2011 |
| WO | 9531053 A1 | 11/1995 |

* cited by examiner

METHOD FOR DETECTING VIBRATION IN A RAIL VEHICLE

BACKGROUND OF THE INVENTION

Field of the Invention

The invention concerns a method for detecting a vibration of a driven axle system of a rail vehicle, with which a sensor system detects a parameter indicating the vibration of an element of the axle system and an evaluating unit evaluates a signal of the sensor system.

When operating powered rail vehicles, juddering of one or a plurality of driven axles can occur. The juddering occurs at driving points at which the characteristic curve of the traction between the wheels and the rails plotted against the slip decreases with increasing slip, the slip increases continuously and the wheel adhesion to the rail decreases. The juddering is thus dependent on the track, because a rail suddenly becoming smoother causes an increase of the slip and a reduction of the traction between the wheels and the rails, so that juddering can start suddenly under otherwise identical driving conditions. In order to terminate the juddering, the driving point must be returned to a flat point or the rising region of the characteristic curve, the drive torque must therefore be reduced.

BRIEF SUMMARY OF THE INVENTION

It is an object of the present invention to specify a method for vibration detection with which the vibration of the driven axle system of the rail vehicle can be reliably detected.

This object is achieved by a method of the above-mentioned type, with which the sensor system according to the invention comprises a motion sensor that detects the displacement of the element that is carried out as a rotation as a parameter, wherein the element is part of a bogie of the rail vehicle to which a juddering motion of the driven and juddering axle is transferred.

The invention is based on the consideration that juddering of a driven axle is primarily caused by a torsional vibration of the shaft. The two wheels mounted on the shaft alternately slip across the rail and with both masses form oppositely vibrating vibration bodies on the shaft, so that the juddering is connected to a large mass displacement. This does not only cause the torque acting on the shaft to sometimes be very large and the shaft to be under enormous mechanical load, but also connected elements to vibrate strongly as a result of the displacement of large masses. In particular, such juddering causes high amplitude vibrations that can be reliably detected by a motion sensor.

Advantageously, the vibration is identified as such, so that countermeasures can be taken, for example the drive torque of the driven shaft is changed, in particular reduced. In this case it is advantageously placed at a driving point at which the characteristic curve of the traction between the wheel and the rail plotted against the slip is increasing or only decreasing gently with the slip.

Any derivative of the position against time is understood as a displacement below, so that a change of the location of the element or of a part thereof, an acceleration of the element or of a part thereof or a still higher derivative can be considered to be a displacement.

Advantageously, a rhythmic displacement of the element is detected, so that the measurement period of the sensor extends over a plurality of periods of the vibration and the signal of the sensor is also evaluated over a plurality of vibration periods.

Advantageously, the vibration is a juddering caused by traction characteristics of the wheels of the driven axle system on the rail. The identification of such a vibration is particularly advantageous, because highly adverse material effects can be caused by the juddering, which can be prevented as a result of the identification.

In an advantageous embodiment of the invention the sensor system comprises an acceleration sensor that detects an acceleration of the element as a parameter. The acceleration can be a longitudinal acceleration, i.e. a translational acceleration of the element. The vibration of the element is connected to a rhythmic acceleration of the element or of a part thereof, which can be detected by the motion sensor. Advantageously, the sensor is connected to the element and vibrates itself, so that the vibration of the sensor—or more generally speaking, the displacement of the sensor—can be measured.

It is also advantageous if the sensor system comprises a rotation sensor that detects an angle or an angular rate of the element as a parameter. The displacement is in particular a rotary acceleration of the element here. A juddering caused by a torsional vibration of the shaft can result in a rotary acceleration of the chassis or bogie. Because a torsional vibration sometimes pulls the one wheel forwards and the other wheel rearwards and then the one wheel rearwards and the other wheel forwards depending on the vibration phase, the juddering shaft exerts an alternating torque about a vertical axle on the driven axle system and in particular the bogie. Said vibration can be detected by a rotation sensor.

A further advantageous embodiment of the invention provides that the sensor system comprises at least three acceleration sensors, which detect a three-dimensional acceleration of the element as a parameter. The three-dimensional acceleration can be a longitudinal acceleration or an angular acceleration of the element.

Advantageously, a rotational or angular rate of the element is detected as the displacement. For this purpose, the sensor system advantageously comprises three rotation sensors that detect a rotation in three dimensions. Advantageously, a rotary displacement of the element about the vertical axle is measured by the rotation sensor.

In order to also detect an initial juddering at an early stage, it is advantageous to be able to detect even small vibrations. This can be achieved in a simple manner if the sensor system comprises a sensor of an inertial navigation system. Such a system usually contains very fine sensors that detect accelerations as well as rates of rotation or angle increments of the system very finely and evaluate them against time. In addition, inertial navigation systems are versatile, as a result of which they can be manufactured in relatively high quantities and are thus comparatively inexpensive. An inertial navigation system is advantageously a unit that comprises translational acceleration sensors and advantageously also rotation sensors, wherein the rotation sensors can also be sensitive to acceleration and thus can measure an angular acceleration. An inertial navigation system usually also comprises an evaluating unit that detects the signals of the sensors and combines them into a result.

The element is a part of a bogie of the rail vehicle, to which a juddering motion of the driven and juddering shaft is transferred, in particular a motor housing or gearbox housing. A bogie provides many options for the arrangement of the sensor system on which the juddering is superimposed differently. As a result the juddering can be measured and evaluated in the desired manner.

The vibration of a driven shaft generally takes place at a natural frequency, wherein a natural frequency of a critical natural oscillation is known. It is therefore conducive to reliable detection of the vibration if signals of the sensor that are irrelevant to the detection of a vibration are filtered out. For this purpose the invention proposes that the signal of the sensor system is filtered to a frequency band that lies around the natural oscillation of the vibration to be detected. Filtering by a hairpin filter is particularly advantageous. Such a filter places a very narrow band about the natural vibration frequency, so that essentially only signals relevant to vibration are evaluated.

Juddering caused by a torsional vibration of a driven shaft not only results in a longitudinal acceleration of the driven system, in particular of the bogie, in or opposite to the direction of travel, but can also result in a rotary acceleration of the driven system. A particularly reliable detection of such juddering is possible if the vibration is detected from a longitudinal displacement and a rotary displacement of the element. The signals of a longitudinal acceleration sensor and of an angular acceleration sensor can also be evaluated and the evaluations can be combined such that the common presence of the longitudinal acceleration and the rotary acceleration is detected, in particular at the same vibration frequency and also in particular at a constant phase position relative to each other.

In a driven axle system a plurality of vibrations usually overlay each other while the rail vehicle is being driven. The same can be caused by various components and can have different causes. In this case the different vibrations cause or influence each other however, so that one vibration can cause yet another. It can therefore be concluded from the presence of one vibration that another vibration is present. The vibrations can have different frequencies and a plurality of types of vibration can be concluded from an analysis of the frequency spectrum. For this purpose, the signal of the sensor is to be investigated for the frequency spectrum.

It is more reliable if a conclusion is drawn regarding a plurality of types of vibration from the signals of a plurality of motion sensors. Different vibrations are usually present in different magnitudes at different points of the driven axle system. If a plurality of motion sensors are distributed on the driven axle system, then not only the frequency but also the amplitude can differ depending on the position. This enables conclusions to be drawn particularly reliably regarding a plurality of types of vibration or it can be discovered which vibration from a catalog of a plurality of types of vibration is actually present.

It is also advantageous if the position of the origin of the vibration can be concluded from the signals of a plurality of motion sensors. The motion sensors are hereby advantageously disposed outside the geometric center and advantageously also outside the center of gravity of the axle system or of the bogie. If the sensor signals are investigated regarding frequency, amplitude and in particular also phase position relative to each other, then the place of origin of the vibration can be concluded based on known vibration characteristics.

The strength of bogie is highly stressed just by torsional vibrations of a driven shaft. On the other hand the vibration is also dependent on the strength of the bogie. It can be concluded from this that a characteristic of the strength of the bogie, or generally speaking: of the vibrating element, can be detected from the frequency and in particular from the frequency spectrum of the vibration. Material fatigue within the bogie can be concluded from this for example.

Moreover, the invention is designed for a rail vehicle with a driven axle system and a sensor system for detecting a parameter indicating the vibration of an element of the axle system comprising an evaluating unit for evaluating a signal of the sensor system.

In order to reliably detect the vibration of the driven axle system of the rail vehicle, it is proposed that the sensor system comprises a motion sensor, that the parameter is a displacement of the element carried out as a rotation, wherein the element is a part of a bogie of the rail vehicle to which a juddering motion of the driven and juddering axle can be transferred.

The description already given of advantageous embodiments of the invention contains numerous features that are reproduced in the individual dependent claims partly combined to form a plurality thereof. Said features will, however, also be advantageously considered individually by the person skilled in the art and combined to form further purposeful combinations. In particular, said features can each be combined individually and in any suitable combination with the method according to the invention and the apparatus according to the invention according to the independent claims.

The properties, features and advantages of said invention described above, as well as the manner in which the same are achieved, are clearly and unambiguously comprehensible in combination with the following description of the exemplary embodiments, which are explained in detail in connection with the figures. The exemplary embodiments are used to explain the invention and do not limit the invention to the combination of features given therein nor in relation to functional features. Moreover, features of any exemplary embodiment that are suitable for this can also be explicitly considered in isolation, removed from an exemplary embodiment, introduced into a different exemplary embodiment to extend the same and/or combined with any of the claims.

BRIEF DESCRIPTION OF THE SEVERAL VIEWS OF THE DRAWING

In the figures

DESCRIPTION OF THE INVENTION

Figure 1:
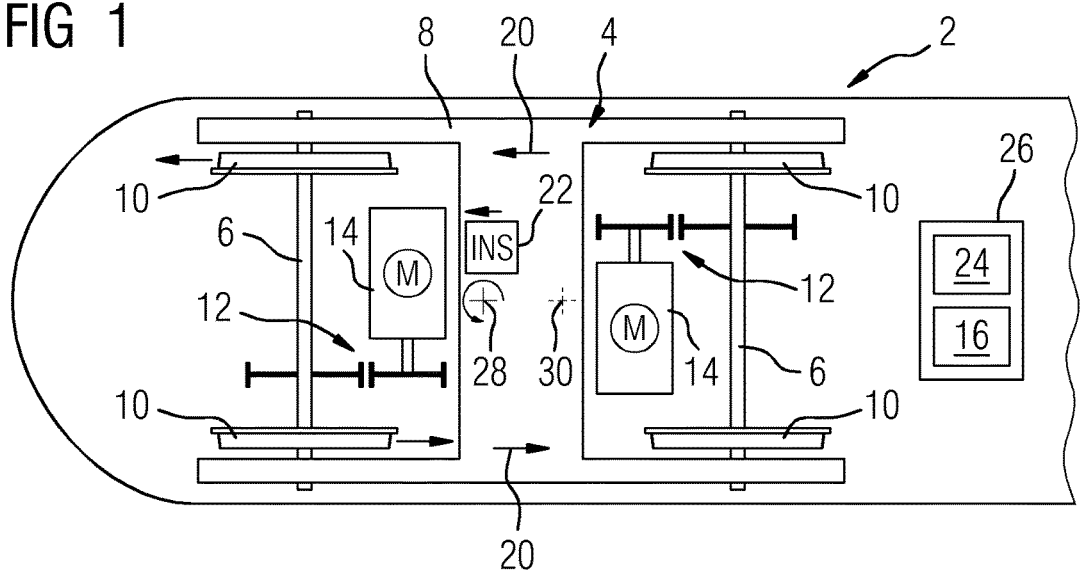
FIG. 1 shows a schematic representation of a rail vehicle with a driven axle system.

FIG. 1 shows a rail vehicle 2 in a partial view and in a schematic representation. The rail vehicle 2 comprises a plurality of driven axle systems 4, of which only the one nearest the front is shown in FIG. 1 and which is disposed at the front of the train. The driven axle system 4 comprises two driven axles, each with a shaft 6 mounted on a bogie 8 and each having two driven wheels 10. Each of the two shafts 6 is connected by means of a gearbox 12 to a drive motor 14 that is activated by a control unit 16 and that applies the force to drive the rail vehicle 2.

While the rail vehicle 2 is being driven it can occur that the drive torque applied by the two drive motors 14 to the two shafts 6 is so high that the traction $F_T$ between the wheel 10 and the rail (not shown) decreases with increasing slip. Such a situation is illustrated in FIG. 3.

Figure 3:
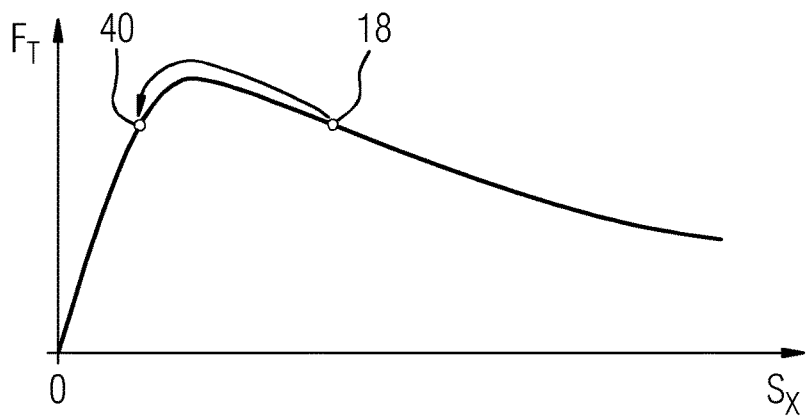
FIG. 3 shows a characteristic curve of traction between wheel and rail plotted against slip.

FIG. 3 shows the traction $F_T$ between the wheel 10 and the rail plotted against the slip $S_X$. If the driving point is displaced as a result of excessive drive torque to the region of the characteristic curve in which it decreases with increasing slip $S_X$, such as for example resulting from a judder point 18 in FIG. 3, then the wheels 10 tend to spin and lose force transfer to the rail. The traction $F_T$ fluctuates rhythmically along the decreasing region of the characteristic curve and the driven axle system 4 vibrates with its natural vibration.

This is shown by way of example in FIG. 1, in which the front shaft 6 of the axle system 4 is juddering. The right wheel is pulled forwards and the left wheel rearwards. As a result of the relatively rigid mounting of the shaft 6 in the bogie 8 the wheels 10 cannot deviate forwards and rearwards, but can only swing up in a torsional vibration of the shaft 6. The driven shaft 6 starts to swing up, which expresses itself in the juddering of the axle.

Said vibration transfers to the entire bogie 8, as is indicated by way of example by the arrows 20 in the center of the bogie 8. The arrows 20 only represent an exemplary vibration, wherein other forms with other vibration displacements and twists of the bogie 8 are also possible.

For detection of such a vibration, the rail vehicle 2 is fitted with a sensor system 22 that comprises a plurality of sensors in said exemplary embodiment. The sensor system 22 is an inertial navigation system (INS), being attached to the bogie 8 somewhat away from the geometric center and the center of gravity of the bogie 8. The sensor system 22 comprises a plurality of motion sensors, in said exemplary embodiment three acceleration sensors and three gyroscopes, of which the three acceleration sensors are provided for the detection of translational acceleration in three mutually perpendicular directions and the three gyroscope sensors are provided for the detection of three rotations or rates of rotation about the same axes. Thus a three-dimensional translational acceleration and—after differentiating the rates of rotation against time—a three-dimensional angular acceleration can be detected. The sensor system with the sensors is connected to an evaluating unit 24 that is integrated together with the control unit 16 into a control means 26, which is for example disposed in a wagon body of the rail vehicle 2.

In the event of juddering of the axle, besides the translational vibration of the bogie 8, which is represented by the arrows 20, a rotational vibration about a rotation axis 28 also occurs, as indicated by the rotating arrow about the rotation axis 28 in FIG. 1. The translational vibration is a longitudinal displacement and the angular vibration is a rotary displacement of the bogie 8 or a part thereof. The vibration of the bogie 8 occurring during juddering is only indicated very roughly for the sake of clarity by the rotating arrow about the rotation axis 28 and the arrows 20 for the translational vibration. In reality the vibration is considerably more differentiated, wherein in the case of vibration of the bogie 8 a plurality of vibrations can occur about a plurality of rotation axes and in a plurality of translational directions.

In the exemplary embodiment shown in FIG. 1 the sensor system 22 measures both the angular vibration about the vertical rotation axis 28 and also the translational vibration, as indicated by the arrows 20. Although the translational vibration is lower than in outer positions as a result of the relatively central position of the sensor system 22 in the bogie 8, as indicated by the smaller straight arrow close to sensor system 22, the angular vibration can also be reliably measured as a result of the relatively central position of the sensor system 22 in the bogie 8. The evaluating unit 24 detects the vibration of the driven axle system 4 as such, for example as a juddering driven axle, from the common presence of translational and rotational vibrations.

Whereas this would not necessarily be caused by juddering of a driven axle in the case of an individual type of vibration, the common vibration in a previously known frequency band clearly determines the juddering. The frequency band, outside which the sensor signals of the sensor system 22 are filtered out in the evaluating unit 24, is selected such that one or a plurality of natural vibrations of the bogie 8 that are characteristic of juddering is/are detected. If the natural vibrations are spaced apart in terms of their frequencies, a plurality of frequency bands can also be detected. For this purpose the evaluating unit 24 comprises one or a plurality of frequency filters for blocking the evaluation of the signals outside of the predetermined frequency bands. Said filters are hairpin filters that are arranged very closely about the natural vibration frequency, or natural vibration frequencies, of the bogie 8.

Depending on which of the driven axles is juddering, the center of vibration for a rotational vibration sometimes lies in the rotation axis 28 and sometimes lies in the rotation axis 30, which is indicated by a dashed cross in FIG. 1 and is also vertically oriented. Depending on which of the two axles is juddering, the angular vibration occurs more about the rotation axis 28 or more about the rotation axis 30. In order to be able to distinguish well between said two rotational vibrations, the sensor system is disposed at a different distance from said two rotation axes 28, 30. The greater the distance, the more the angular component of the vibration decreases and the translational component increases. As a result of the common detection of rotational and translational components of the vibration, the sensor system 22 or the evaluating unit 24 can distinguish well between a vibration about the rotation axis 28 or about the rotation axis 30 and thus between juddering of the front shaft 6 or the rear shaft 6 of the driven axle system 4.

Depending on how strongly which vibration is occurring at which position of the bogie 8, the strength of the bogie 8 and thus material fatigue of supporting parts of the bogie 8 can be concluded. The strength of the bogie 8 or of one or a plurality of elements thereof is concluded in this respect.

Referring to FIG. 1, the vibration detection by the evaluating unit 24 using the juddering of a driven axle has been explained. Obviously, the vibration detection is not limited to the detection of juddering, because other vibrations, caused by other effects, can also be detected in analogous or similar ways. Thus for example group drive oscillations and/or torque oscillations of the motor caused by winding faults in the stator can be detected. In particular, the vibrations can be recognized as such, so that the individual vibrations can be distinguished from each other.

Figure 2:
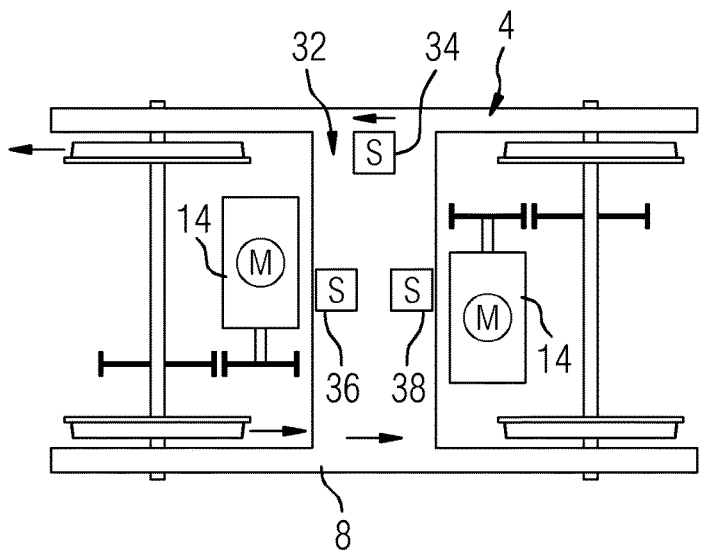
FIG. 2 shows an axle system as in FIG. 1, but with different motion sensors

FIG. 2 shows the driven axle system 4 alone without the schematically indicated rail vehicle 2, this being equivalent to the axle system 4 of FIG. 1. The difference here is the sensor system 32, which comprises a plurality of sensors 34, 36, 38 at different points of the bogie 8. The sensors 34, 36, 38 can be individual sensors, for example an acceleration sensor 34 for detecting a translational acceleration and two acceleration sensors 36, 38, each for detecting a rotational acceleration. In said exemplary embodiment, the two sensors 36, 38 are placed at the location of the rotation axes 28, 30, about which a juddering vibration of the driven axle system 4 is vibrating rotationally. Obviously, other locations on the bogie 8 are also advantageous for attaching suitable sensors, depending on which vibration is to be detected. The translational vibration and the rotational vibration can be distinguished by the three different sensors 34, 36, 38 and it can also be distinguished about which of the two rotation axes 28, 30 more rotational vibration occurs, i.e. how strongly a particular axle is juddering. In this respect the place of origin of the vibration can be concluded from the signals of the plurality of sensors 34, 36, 38 of the sensor system 22, 32.

If juddering of one or both driven axles has been detected, then the control means 16 controls the motors 14 so that the driving point of the relevant driven axle is returned to the flat region about the maximum or the rising region of the characteristic curve shown in FIG. 3, i.e. the slip $S_X$ is reduced. This is indicated by way of example in FIG. 3 by the drawn arrow, by means of which the driving point is returned from the judder point 18 to a drive point 40. This is carried out by a torque reduction of the relevant drive motor 14 such that the wheels 10 of the relevant shaft 6 apply less torque to the rail and roll thereon more. The torque can then increase again and the traction between the wheel and the rail can thus be increased until the drive point 40 is reached.

In FIGS. 1 and 2 the detection of a vibration of the rail vehicle 2 using the vibration of a driven axle system 4 is illustrated and explained. It is however also possible that the vibration of a different element of the rail vehicle 2 that can even lie outside the driven axle system of the rail vehicle 2 is detected. In this respect the invention can be applied to the detection of a vibration of an element of a rail vehicle 2 by measurement of a parameter indicating the vibration of the element.

The invention claimed is:

1. A method for detecting a rotary vibration of a driven axle system of a rail vehicle, the method comprising the following steps:
   providing an element as a part of a bogie of the rail vehicle to which a juddering motion of a driven and juddering axle is transferred;
   detecting a parameter indicating a vibration of the element of the axle system by using a sensor system;
   detecting the parameter as a movement of the element carried out as a rotation by using a motion sensor of the sensor system, and the movement carried out as a rotation being a rotary movement of the bogie; and
   evaluating a signal of the sensor system by using an evaluating unit.

2. The method according to claim 1, which further comprises detecting an acceleration of the element as a parameter by using an acceleration sensor of the sensor system.

3. The method according to claim 1, wherein the motion sensor is a rotation sensor.

4. The method according to claim 1, wherein the sensor system, 32) includes a sensor of an inertial navigation system.

5. The method according to claim 1, which further comprises filtering the signal of the sensor system to a frequency band lying about a natural oscillation of the vibration.

6. The method according to claim 1, which further comprises detecting the vibration from a longitudinal movement and a rotary movement of the element.

7. The method according to claim 1, which further comprises concluding one of a plurality of types of vibration from signals of a plurality of motion sensors.

8. The method according to claim 1, which further comprises concluding a place of origin of the vibration from signals of a plurality of motion sensors.

9. The method according to claim 1, which further comprises concluding a strength of the element from sensor data.

10. A rail vehicle, comprising:
    a bogie including a driven axle system having a driven and juddering axle and an element to which a juddering motion of said driven and juddering axle is transferred;
    a sensor system for detecting a parameter indicating a rotary vibration of said element of said axle system, said sensor system including a motion sensor, said parameter being movement of said element carried out as a rotation, and said movement carried out as a rotation being a rotary movement of said bogie; and
    an evaluating unit for evaluating a signal of said sensor system.

* * * * *